United States Patent
Shigeta et al.

(10) Patent No.: US 9,602,736 B2
(45) Date of Patent: Mar. 21, 2017

(54) IMAGE SENSING APPARATUS

(71) Applicant: CANON KABUSHIKI KAISHA, Tokyo (JP)

(72) Inventors: Kazuyuki Shigeta, Yokohama (JP); Fujio Kawano, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 22 days.

(21) Appl. No.: 14/564,205

(22) Filed: Dec. 9, 2014

(65) Prior Publication Data
US 2015/0189147 A1 Jul. 2, 2015

(30) Foreign Application Priority Data

Dec. 27, 2013 (JP) ................. 2013-273168

(51) Int. Cl.
| H04N 9/73 | (2006.01) |
|---|---|
| H04N 9/47 | (2006.01) |
| H04N 5/238 | (2006.01) |
| H04N 5/235 | (2006.01) |
| H04N 5/225 | (2006.01) |

(52) U.S. Cl.
CPC ......... H04N 5/2352 (2013.01); H04N 5/2256 (2013.01)

(58) Field of Classification Search
CPC .. H04N 5/2353; H04N 5/2354; H04N 5/2357; H04N 5/2256; H04N 5/374; F21K 5/023; A61B 5/007; G01N 21/553; G01N 21/64
USPC ...... 348/226.1, 225.1, 366, 910, 218.1, 131, 348/68, 56, 367, 79, 65; 220/459.1; 396/155; 250/459.1
See application file for complete search history.

(56) References Cited

U.S. PATENT DOCUMENTS

| 2005/0024503 A1* | 2/2005 | Baer ............... H04N 5/2357 348/226.1 |
| 2009/0147252 A1* | 6/2009 | Goto ............... G01N 21/6458 356/244 |
| 2009/0153710 A1* | 6/2009 | John ............... H04N 5/23248 348/296 |

(Continued)

FOREIGN PATENT DOCUMENTS

JP      2000-292353      10/2000

*Primary Examiner* — Xi Wang
(74) *Attorney, Agent, or Firm* — Fitzpatrick, Cella, Harper & Scinto

(57) ABSTRACT

An image sensing apparatus includes an image sensor including a plurality of pixels and configured to sense an optical image formed from fluorescence or phosphorescence generated by excitation light from an excitation light source when periods during which pixels perform the photoelectric conversion sequentially end on the respective rows, a mechanical shutter configured to control exposure on the image sensor, and a control unit configured to control the image sensor and the mechanical shutter so as to prevent overlapping between an excitation period and a detection period, the excitation period being a period during which the excitation light source emits excitation light, the detection period being a period during which the plurality of pixels are commonly set in a state of performing the photoelectric conversion for detecting fluorescence or phosphorescence and the mechanical shutter is open.

16 Claims, 14 Drawing Sheets

(56) References Cited

U.S. PATENT DOCUMENTS

| | | | | |
|---|---|---|---|---|
| 2009/0284643 A1* | 11/2009 | Shibuno | ................ | G03B 13/00 |
| | | | | 348/347 |
| 2010/0090127 A1* | 4/2010 | Yekta | ................ | G01N 21/6408 |
| | | | | 250/459.1 |
| 2012/0162466 A1* | 6/2012 | Katagawa | ............ | H04N 5/2351 |
| | | | | 348/226.1 |
| 2013/0087718 A1* | 4/2013 | Mei | .................... | G01N 21/6408 |
| | | | | 250/458.1 |
| 2013/0087719 A1* | 4/2013 | Yang | ..................... | G01N 21/64 |
| | | | | 250/459.1 |

* cited by examiner

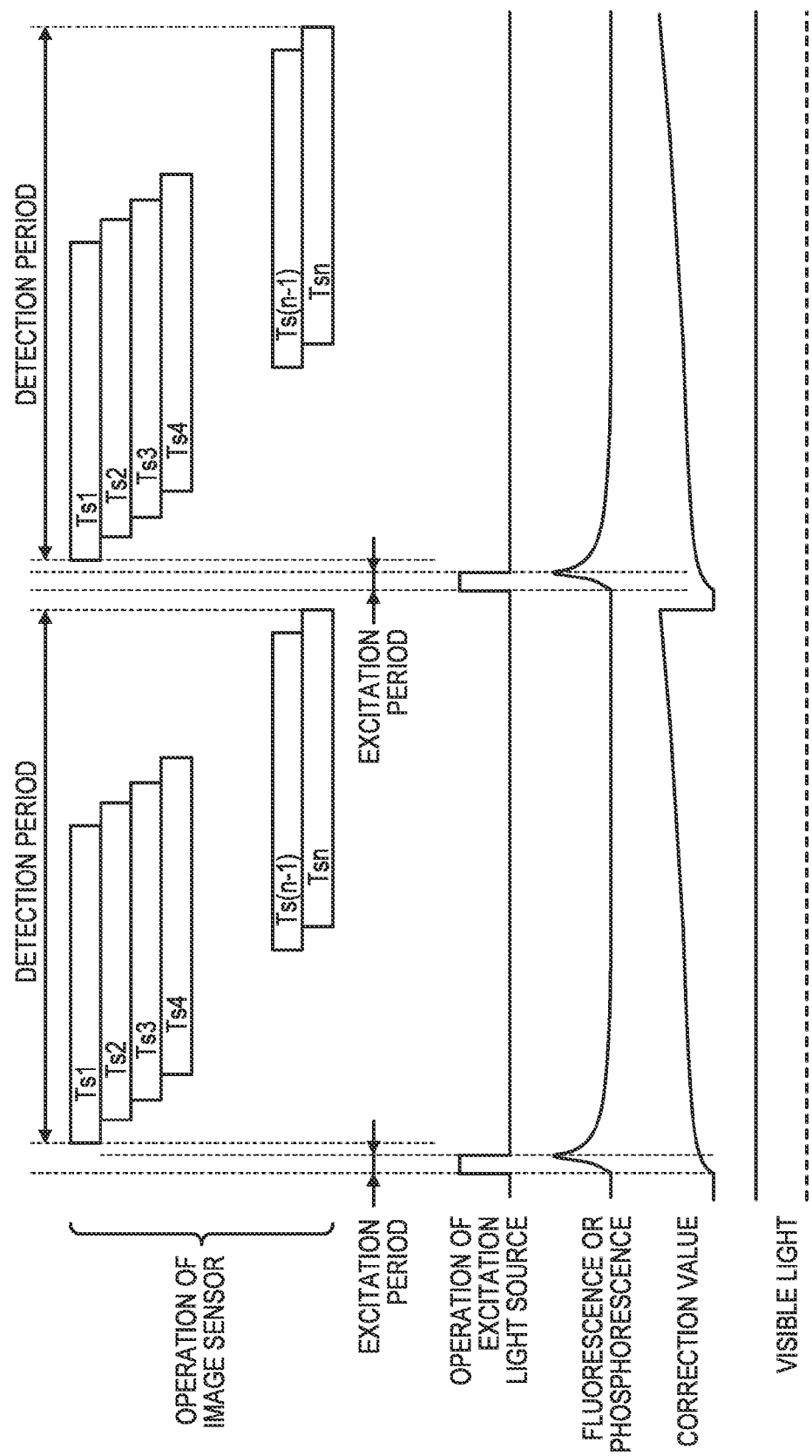

IMAGE SENSING APPARATUS

BACKGROUND OF THE INVENTION

Field of the Invention

The present invention relates to an image sensing apparatus which senses the image formed by the fluorescence or phosphorescence generated by excitation light.

Description of the Related Art

Japanese Patent Laid-Open No. 2000-292353 discloses a fluorescence image forming apparatus which includes a plurality of light sources to illuminate an image carrier with excitation light which excites a fluorescent material and light which does not excite the material. This apparatus prevents the superimposition of excitation light as noise on a fluorescence image by arranging an excitation light cut filter which cuts off excitation light in front of a CCD camera.

In general, however, the excitation spectrum and fluorescence spectrum of a fluorescent material respectively have corresponding widths. When the peak wavelength difference (wavelength difference caused by a Stokes shift) between the excitation spectrum and fluorescence spectrum is small, unnecessary excitation wavelengths cannot be often sufficiently removed and are left as background noise even by using an optical filter having steep cutoff wavelength characteristics. In the apparatus disclosed in Japanese Patent Laid-Open No. 2000-292353, when the wavelength band of excitation light and the wavelength band of fluorescence have an overlapping range, an excitation light component becomes noise.

In medical and biological applications, it is increasingly the case that near-infrared light with high transmittances is used both as excitation light and fluorescence, that is, excitation light and fluorescence with near wavelengths are used. For this reason, it is difficult to separate excitation light and fluorescence by using an optical filter. In addition, a mechanism for attaching/detaching an optical filter is required when performance of both imaging by using the optical filter and imaging without using the optical filter is required.

SUMMARY OF THE INVENTION

The present invention provides a technique advantageous in sensing an optical image with low noise, which is formed by the fluorescence or phosphorescence generated by excitation light.

One of aspects of the present invention provides an image sensing apparatus comprising: an image sensor including a plurality of pixels which are arrayed to form a plurality of rows and a plurality of columns and perform photoelectric conversion for light, the image sensor being configured to sense an optical image formed from fluorescence or phosphorescence generated by excitation light from an excitation light source when periods during which pixels perform the photoelectric conversion sequentially end on the respective rows; a mechanical shutter configured to control exposure on the image sensor; and a control unit configured to control the image sensor and the mechanical shutter so as to prevent overlapping between an excitation period and a detection period, the excitation period being a period during which the excitation light source emits excitation light, the detection period being a period during which the plurality of pixels are commonly set in a state of performing the photoelectric conversion for detecting fluorescence or phosphorescence and the mechanical shutter is open.

Further features of the present invention will become apparent from the following description of exemplary embodiments with reference to the attached drawings.

BRIEF DESCRIPTION OF THE DRAWINGS

FIG. 14 is a chart exemplarily showing the operation of the application example shown in FIG. 13.

DESCRIPTION OF THE EMBODIMENTS

An exemplary embodiment of the present invention will be described below with reference to the accompanying drawings.

Figure 1:
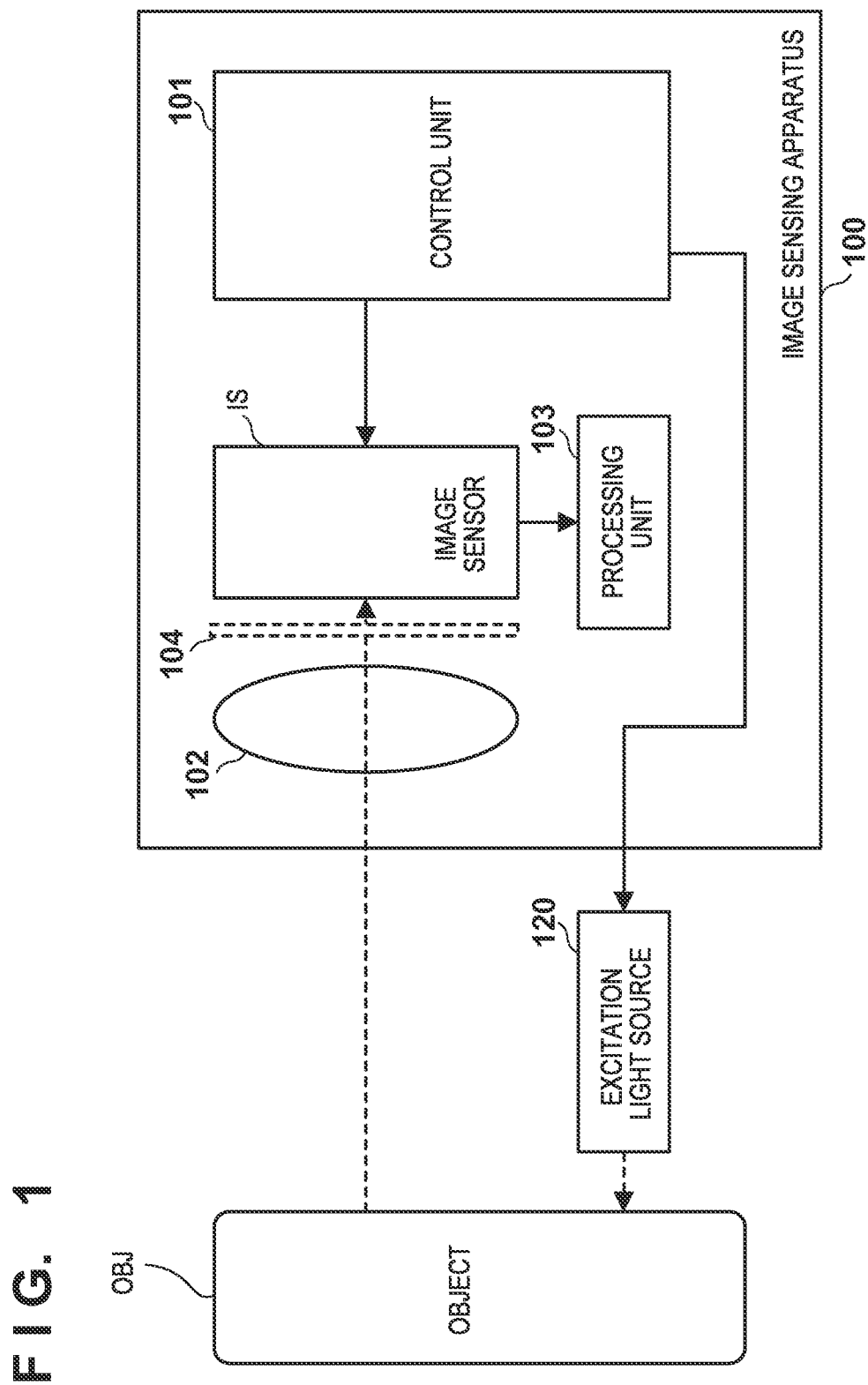
FIG. 1 is a block diagram showing an image sensing apparatus according to an embodiment of the present invention.

An image sensing apparatus 100 according to one embodiment of the present invention will be described with reference to FIG. 1. The image sensing apparatus 100 includes an image sensor IS, a control unit 101, an optical system 102, and a processing unit 103. The image sensing apparatus 100 includes an excitation light source 120. Note that the excitation light source 120 may be provided separately from the image sensing apparatus 100. The image sensor IS can be, for example, a CMOS image sensor or CCD image sensor. The image sensor IS includes a plurality of pixels arrayed to form a plurality of rows and a plurality of columns. The excitation light source 120 emits excitation light under the control of the control unit 101. The excitation light source 120 irradiates an object OBJ with excitation light. The excitation light excites the fluorescent material or phosphorescent material contained in the object OBJ to generate fluorescence or phosphorescence. The optical system 102 forms an image originating from fluorescence or phosphorescence from the object OBJ on the imaging area of the image sensor IS. The control unit 101 drives the image sensor IS to sense an optical image on the imaging area and output the image. The processing unit 103 processes the image output from the image sensor IS. The image sensing apparatus 100 may further include a mechanical shutter 104 for controlling exposure on the image sensor IS.

Figure 2:
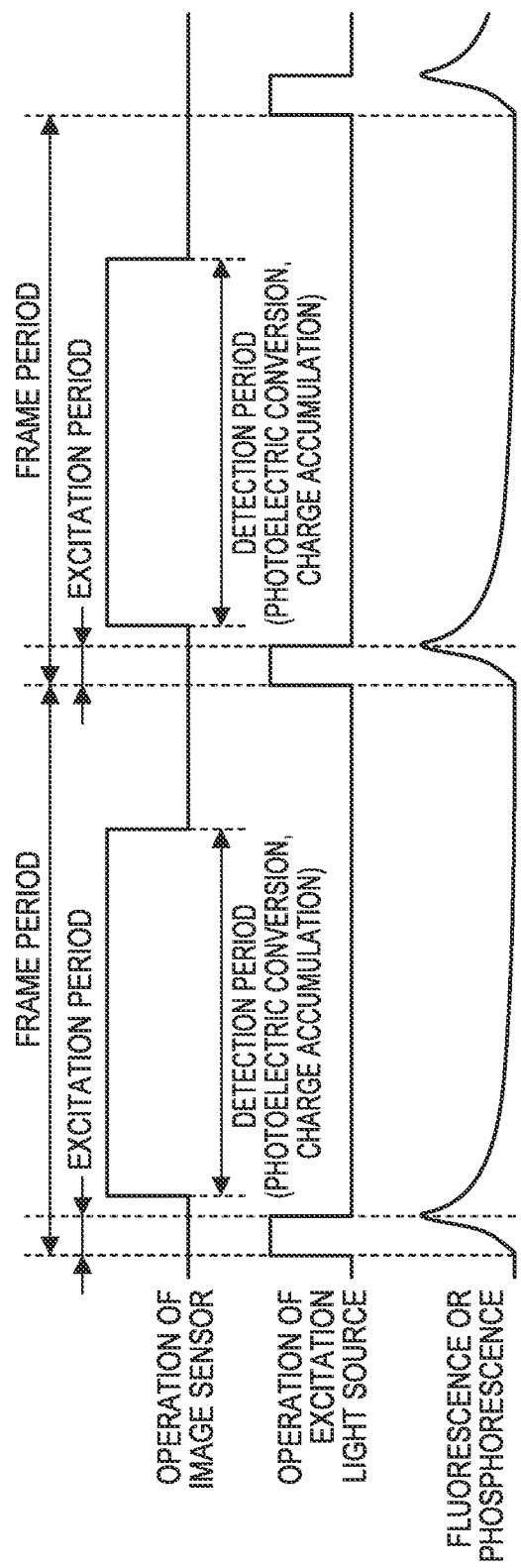
FIG. 2 is a chart exemplarily showing the operation of the image sensing apparatus shown in FIG. 1.

FIG. 2 exemplarily shows the operation of the image sensing apparatus 100. More specifically, FIG. 2 exemplarily shows the operation of the image sensor IS ("operation of image sensor") and the operation of the excitation light source 120 ("operation of excitation light source") in the image sensing apparatus 100. FIG. 2 also exemplarily shows the intensity of fluorescence or phosphorescence generated by the object OBJ irradiated with excitation light from the excitation light source 120. An excitation period is a period during which the excitation light source 120 emits excitation light. A detection period is a period during which the image sensor IS detects through photoelectric conversion the fluorescence or phosphorescence generated by excitation light from the excitation light source 120. More specifically, a detection period is a period during which at least one pixel (typically pixels on at least one row) of the image sensor IS is detecting fluorescence or phosphorescence.

In this case, a detection operation is the operation of making the photoelectric converter of a pixel perform photoelectric conversion upon receiving fluorescence or phosphorescence and accumulate the charge generated by photoelectric conversion. In a state in which a pixel receives fluorescence or phosphorescence while the photoelectric converter of the pixel is reset (fixed to a predetermined potential), although photoelectric conversion is performed, the charge generated by the photoelectric conversion is not accumulated, and hence no detecting operation is performed. In addition, in a state in which the reset of the photoelectric converter of a pixel is canceled and no fluorescence or phosphorescence strikes the pixel (the pixel is shielded by a mechanical shutter), since no photoelectric conversion is performed, no detecting operation is performed.

As exemplarily shown in FIG. 2, the control unit 101 controls an excitation period and a detection period so as to prevent them from overlapping each other. Control on an excitation period is equivalent to control on a period during which the excitation light source 120 is made to generate excitation light. Control on a detection period is performed by, for example, controlling the image sensor IS. Alternatively, a detection period may be controlled by controlling the mechanical shutter 104 or controlling the image sensor IS and the mechanical shutter 104.

In this case, the control unit 101 may generate a control signal for controlling the excitation light source 120 based on a control signal for driving the image sensor IS or may generate a control signal for controlling the image sensor IS based on a control signal for controlling the excitation light source 120. Alternatively, the control unit 101 may generate a control signal for driving the image sensor IS and a control signal for controlling the excitation light source 120 based on synchronization signals such as clock signals.

Fluorescence or phosphorescence is generated with a delay from irradiation with excitation light. The emission lifetime of fluorescence is about $10^{-9}$ to $10^{-7}$ sec, and the emission lifetime of phosphorescence is about $10^{-9}$ to 10 sec. The intensity of fluorescence or phosphorescence gradually decreases after the end of irradiation with excitation light. Noise originating from excitation light components does not tend to be superimposed on an image (to be referred to as a fluorescence image or phosphorescence image hereinafter) obtained by sensing an optical image formed from fluorescence or phosphorescence while controlling an excitation period and a detection period so as to prevent them from overlapping each other. This makes it possible to obtain a fluorescence image or phosphorescence image containing no noise originating from excitation light. When the wavelength band of excitation light overlaps the wavelength band of fluorescence or phosphorescence, in particular, it is difficult to separate them from each other by using an optical filter. However, this embodiment is free from such a problem.

Figure 3:
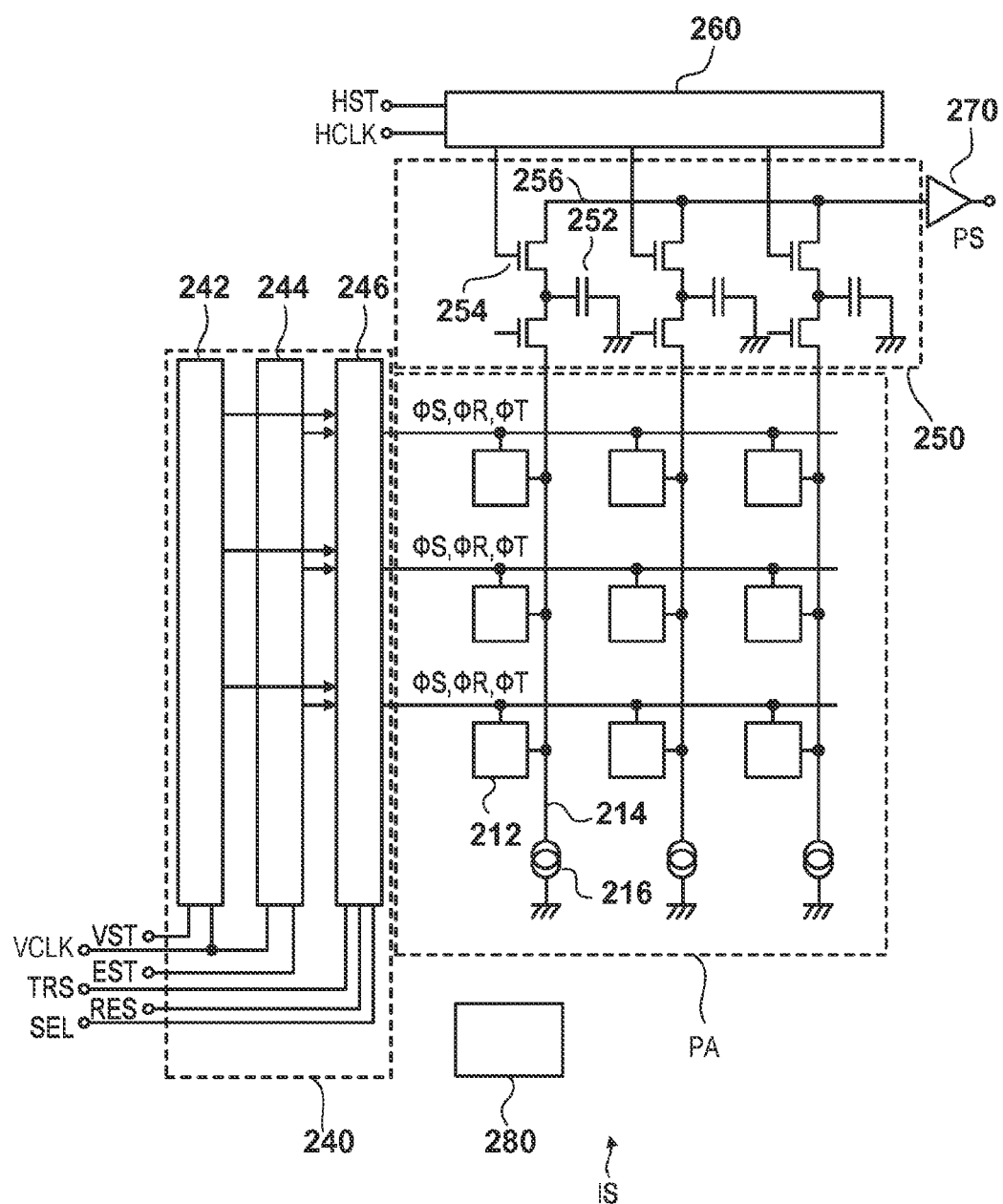
FIG. 3 is a circuit diagram exemplarily showing the arrangement of an image sensor.

FIG. 3 exemplarily shows the arrangement of the image sensor IS. The image sensor IS includes a pixel array PA described above. Referring to FIG. 3, the pixel array PA is constituted by nine pixels 212 arrayed to form 3 rows×3 columns. In practice, however, more pixels 212 are arrayed to form more rows and columns.

The image sensor IS includes a row selection unit 240, a readout unit 250, a column selection unit 260, an output unit 270, and a control unit 280, in addition to the pixel array PA. The row selection unit 240 selects a row in the pixel array PA. In this case, row selection is an operation for outputting signals of pixels belonging to the row to corresponding column signal lines 214. The row selection unit 240 resets pixels on a selected row, makes the pixels start a charge accumulating operation (accumulating charge), or makes the pixels output a signal corresponding to accumulated charges to the column signal line 214. A current source 216 supplies a current to each pixel 212 via the column signal lines 214.

The row selection unit 240 includes a first shift register 242 for readout operation and a second shift register 244 for an electronic shutter. The row selection unit 240 also includes a selector 246 for selecting one of signals from the first shift register 242 and the second shift register 244 and supplying the selected signal to the pixel array PA. The first shift register 242 operates in accordance with a start pulse VST and a transfer clock VCLK generated by the control unit 280. The second shift register 244 operates in accordance with a start pulse EST and the transfer clock VCLK generated by the control unit 280. The selector 246 selects one of signals from the first shift register 242 and the second shift register 244 in accordance with a selection signal SEL generated by the control unit 280.

The pixels 212 arranged on the same column are connected to the common column signal line 214. Each holding capacitor 252 for holding a signal output from the pixel 212 is connected to each of the column signal lines 214. The holding capacitors 252 are connected to a horizontal signal line 256 via horizontal transfer switches 254. Each horizontal transfer switch 254 is controlled by a column selection signal from the column selection unit 260. The column selection unit 260 can be formed as a horizontal scanning circuit controlled by a start pulse HST and a transfer clock HCLK generated by the control unit 280. The horizontal signal line 256 is connected to the output unit 270. When each horizontal transfer switch 254 is turned on, the signal held in the corresponding holding capacitor 252 is supplied to the output unit 270 via the horizontal signal line 256. This signal is amplified by the output unit 270 and is output as a pixel signal from an output terminal PS.

Figure 4:
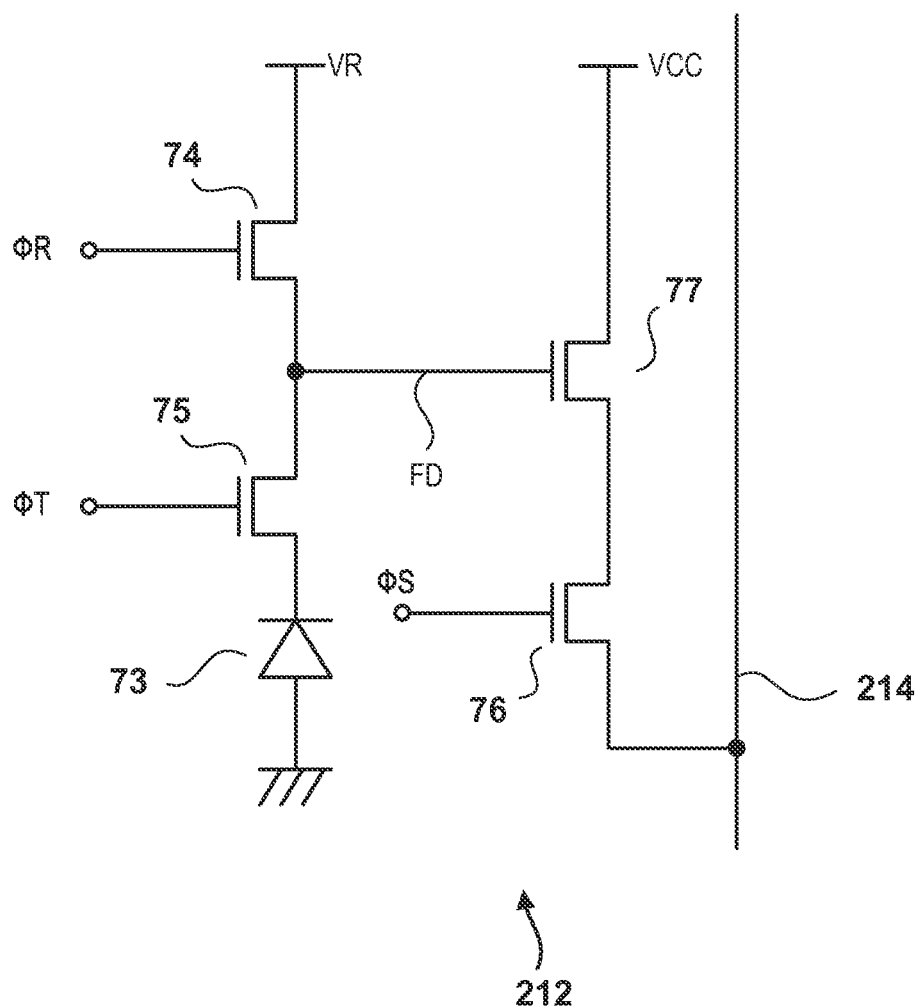
FIG. 4 is a circuit diagram exemplarily showing the arrangement of a pixel.

FIG. 4 shows an example of the arrangement of the pixel 212. The pixel 212 can include a photoelectric converter 73, a transfer transistor 75, an amplifying transistor 77, a reset transistor 74, and a selection transistor 76. The photoelectric converter 73 can include, for example, a photodiode having an anode grounded and a cathode connected to the drain terminal of the transfer transistor 75. The source of the transfer transistor 75, the source of the reset transistor, and the gate of the amplifying transistor 77 constitute a charge voltage converter FD which converts charge into a voltage. The charge voltage converter FD includes a floating diffusion. The drain of the reset transistor 74 is connected to a power supply VR. The drain of the amplifying transistor 77 is connected to a power supply VCC. The source of the amplifying transistor 77 is connected to the column signal line 214 via the selection transistor 76.

When the row selection unit 240 activates a transfer signal φT to turn on the transfer transistor 75, the charge accumulated in the photoelectric converter 73 is transferred to the charge voltage converter FD. When the row selection unit 240 activates a reset signal φR to turn on the reset transistor 74, the voltage of the charge voltage converter FD is reset to a voltage corresponding to the power supply VR. In addition, when the transfer signal φT and the reset signal φR are simultaneously activated, the photoelectric converter 73 is also reset to a voltage corresponding to the voltage of the power supply VR. The operation of resetting the photoelectric converter 73 can be understood as the operation of resetting the pixel 212. When the row selection unit 240 activates a selection signal φS to turn on the selection transistor 76, a source follower circuit is formed by the amplifying transistor 77 and the current source 216. This source follower circuit outputs a signal corresponding to the voltage of the gate of the amplifying transistor 77 to the column signal line 214.

The operation of the image sensor IS in FIGS. 3 and 4 will be described with reference to FIGS. 5 and 6. VST, VCLK, HST, and HCLK correspond to VST, VCLK, HST, and HCLK in FIGS. 3 and 4. φR1, φR2, φRn, and φRn+1 are the reset signals φR supplied to the pixels 212 on the first, second, nth, and (n+1)th rows. φT1, φT2, φTn, and φTn+1 are the transfer signals φT supplied to the pixels 212 on the first, second, nth, and (n+1)th rows. In this case, the first and second rows are black reference pixel rows, and the nth and (n+1)th rows are effective pixel rows.

Figure 5:
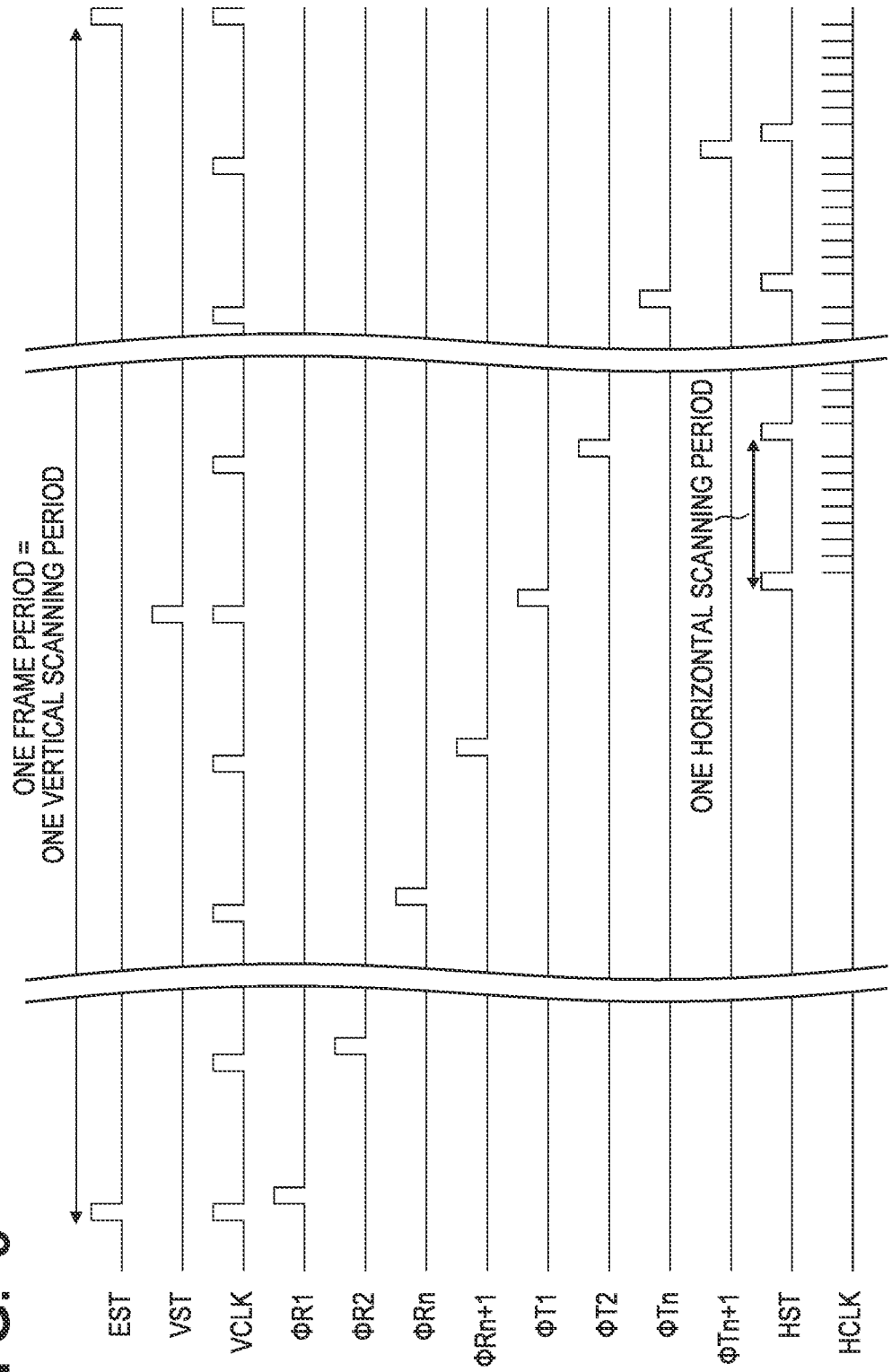
FIG. 5 is a chart exemplarily showing the operation of the image sensor.

Referring to FIG. 5, a period from EST (or VST) to EST (or VST) in the next frame is a period corresponding to one frame, that is, one frame period=one vertical scanning period. Activation starts from the first row in response to the activation of EST, and the row to be selected by the second shift register 244 moves vertically in synchronism with VCLK. In accordance with this operation, φR1, φR2, . . . , φRn, and φRn+1 are sequentially activated.

On the other hand, vertical scanning starts from the first row in response to the activation of VST, and the row to be selected by the first shift register 242 moves sequentially downward in synchronism with VCLK. In accordance with this operation, φT1, φ2, . . . , φTn, and φTn+1 are sequentially activated. This transfers the charge in the photoelectric converter 73 to the charge voltage converter FD. A signal corresponding to the charge transferred to the charge voltage converter FD is output to the column signal line 214 and written in the holding capacitor 252. Thereafter, the column selection unit 260 starts horizontal scanning in response to the activation of HST. With this operation, the holding capacitors 252 on a plurality of columns are sequentially selected in synchronism with HCLK. The signals held in the selected holding capacitors 252 are output from an output terminal PS via the horizontal signal line 256 and the output unit 270.

Figure 6:
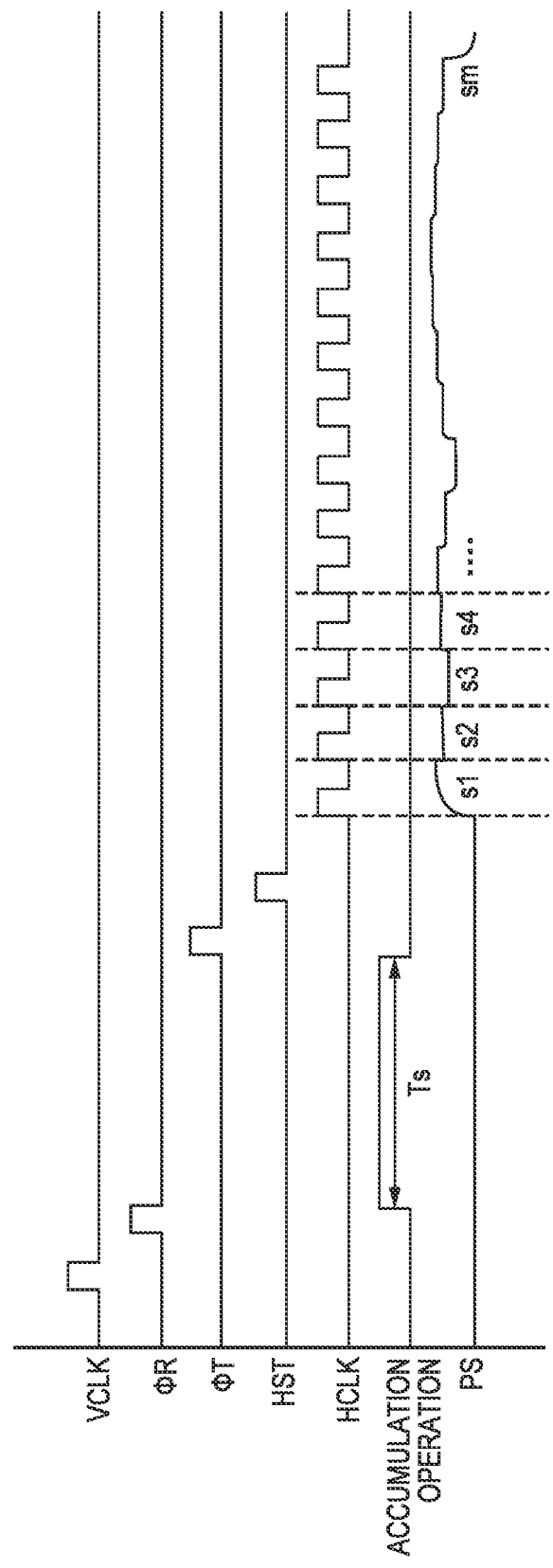
FIG. 6 is a chart exemplarily showing the operation of the image sensor.

FIG. 6 is an enlarged view of one horizontal scanning period in FIG. 5. A charge accumulation period Ts in a pixel is a period from the timing at which φRn is inactivated after it is activated to the timing at which φTn is activated. As shown in FIG. 5, since the reset signal φR and the transfer signal φT are activated at different timings on different rows, the start and end of the charge accumulation period Ts shift for each row. The operation of making the start and end timings of the charge accumulation period Ts shift for each row is called a rolling shutter operation. Referring to FIG. 6, the pixel signals output from the output terminal PS are represented by s1, s2, . . . , sm. The image sensor IS outputs pixel signals from the first row to the last row.

Figure 7:
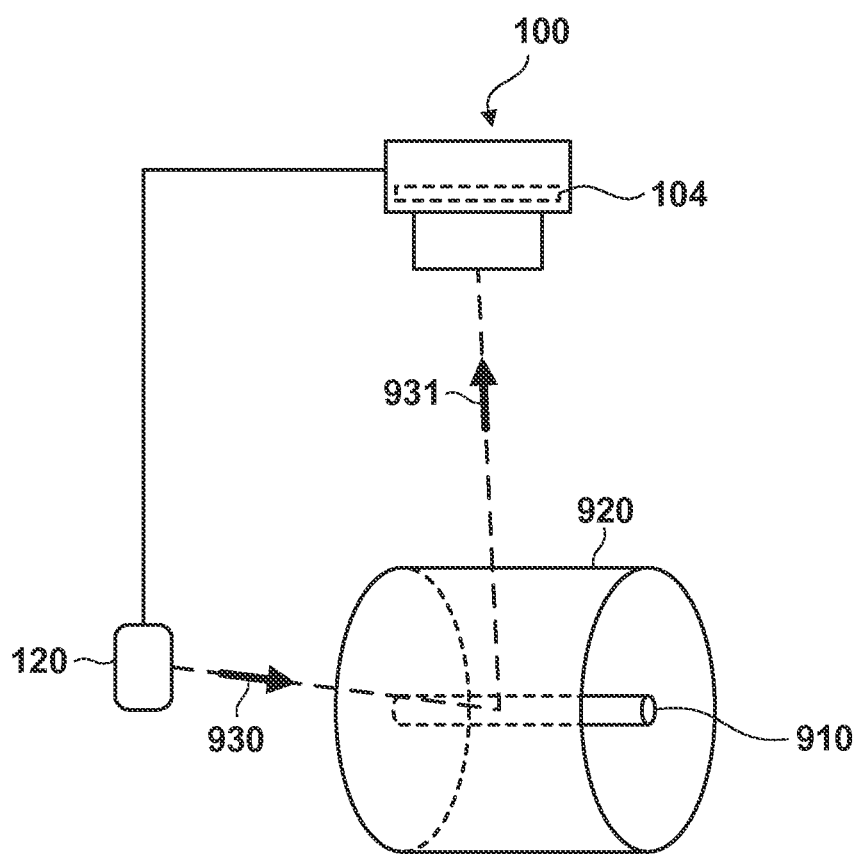
FIG. 7 is a view showing an example of applying the image sensing apparatus shown in FIG. 1 to a biopsy.

FIG. 7 shows an example of applying the image sensing apparatus 100 to a biopsy. An object includes a scattering body 920 and a tissue 910 as an examination target arranged in the scattering body 920. The scattering body 920 is, for example, the arm or body of a subject. The tissue 910 is, for example, a blood vessel. In this case, a fluorescent material has been administered to the tissue 910. The excitation light source 120 irradiates the scattering body 920 with excitation light 930. The tissue 910 irradiated with the excitation light 930 emits fluorescence or phosphorescence 931 excited by the excitation light 930. The image sensing apparatus 100 senses the optical image formed from the fluorescence or phosphorescence 931.

Figure 8:
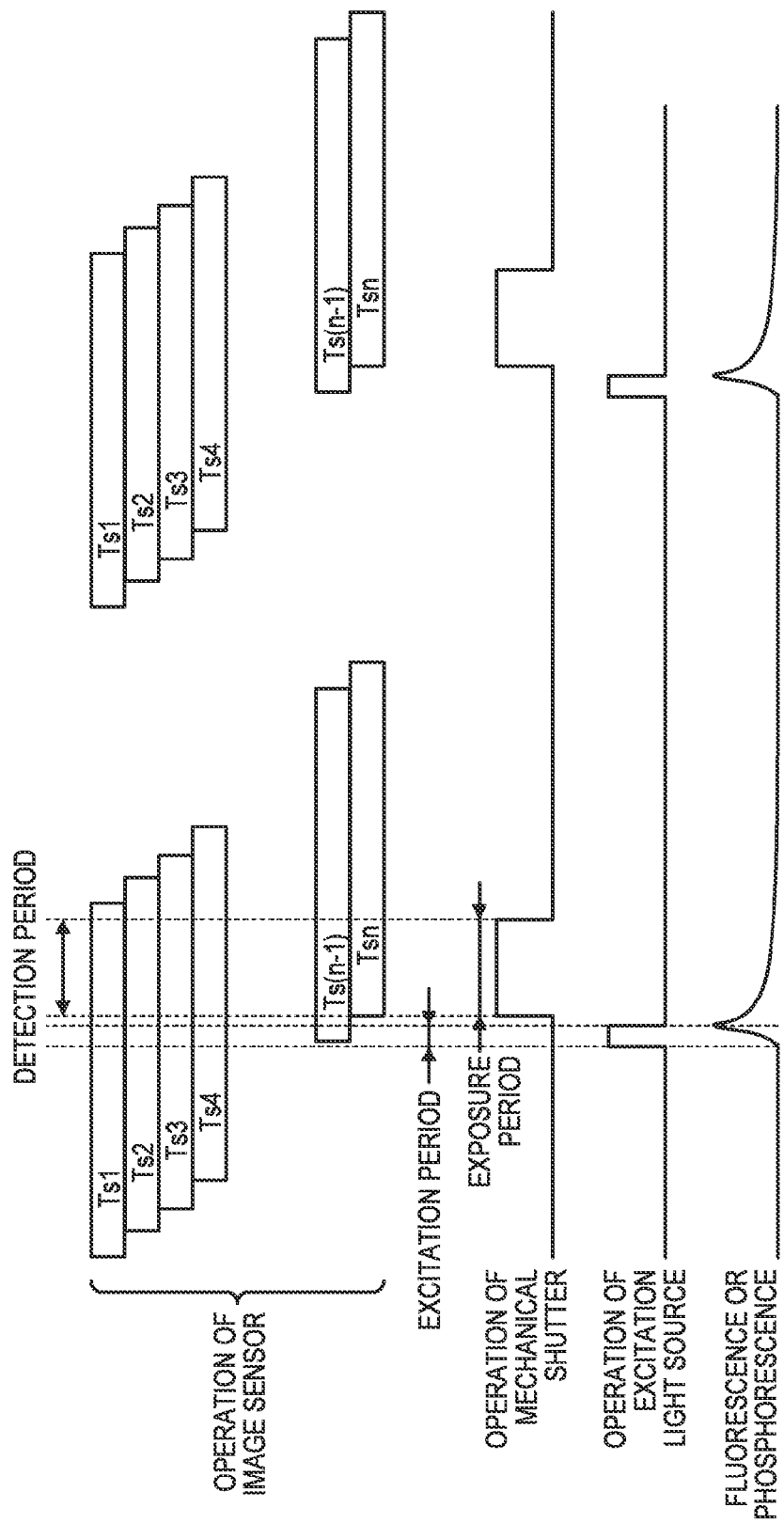
FIG. 8 is a chart showing the first operation example of the image sensing apparatus shown in FIG. 1.

FIG. 8 exemplarily shows the operation of the image sensing apparatus 100. Referring to FIG. 8, Ts1, Ts2, Ts3, . . . , Ts(n−1), and Tsn respectively represent the first, second, third, . . . , (n−1)th, and nth charge accumulation periods in the image sensor IS. "Operation of mechanical shutter" indicates the operation of the mechanical shutter 104. A low-level period is a period during which the image sensor IS is shielded by the mechanical shutter 104. A high-level period is a period during which the image sensor IS is exposed to light without being shielded by the mechanical shutter 104. "Operation of excitation light source" indicates the operation of the excitation light source 120. A low-level period is a period during which the excitation light source 120 is off. A high-level period is a period during which the excitation light source 120 is on (that is, an excitation period). "Fluorescence or phosphorescence" indicates the intensity of fluorescence or phosphorescence generated by an object excited by excitation light from the excitation light source 120. As described above, a detection period is a period during which at least one pixel (typically, pixels on at least one row) of the image sensor IS performs a fluorescence or phosphorescence detecting operation. In the case shown in FIG. 8, in a detection period, all the pixels 212 constituting the pixel array PA of the image sensor IS are in a charge accumulation state (a state in which the charge generated by photoelectric conversion is accumulated), and the mechanical shutter 104 is open. While the mechanical shutter 104 is open, the image sensor IS is exposed to light.

The control unit 101 controls an excitation period and a detection period so as to prevent them from overlapping. That is, the control unit 101 controls the excitation light source 120, the mechanical shutter 104, and the image sensor IS so as to prevent an excitation period and a detection period from overlapping each other. More specifically, the control unit 101 turns on the excitation light source 120 while the mechanical shutter 104 is closed, and opens the mechanical shutter 104 after turning off the excitation light source 120. In this case, the control unit 101 preferably exposes the image sensor IS by opening the mechanical shutter 104 in a period during which all the rows of the image sensor IS is in a charge accumulation period. As exemplarily shown in FIG. 8, the control unit 101 may control the image sensor IS so as to set the pixels 212 on at least some of the rows in a charge accumulation state before the start of an excitation period.

The control unit 101 can be configured to make the image sensor IS sense a plurality of images and make the processing unit 103 composite (for example, add) the plurality of images sensed by the image sensor IS. It is possible to obtain a clear image based on weak fluorescence or phosphorescence by compositing a plurality of images by addition. The control unit 101 can be configured to control the repetition of a cycle including the above excitation period and the above detection period so as to obtain a moving image.

Figure 9:
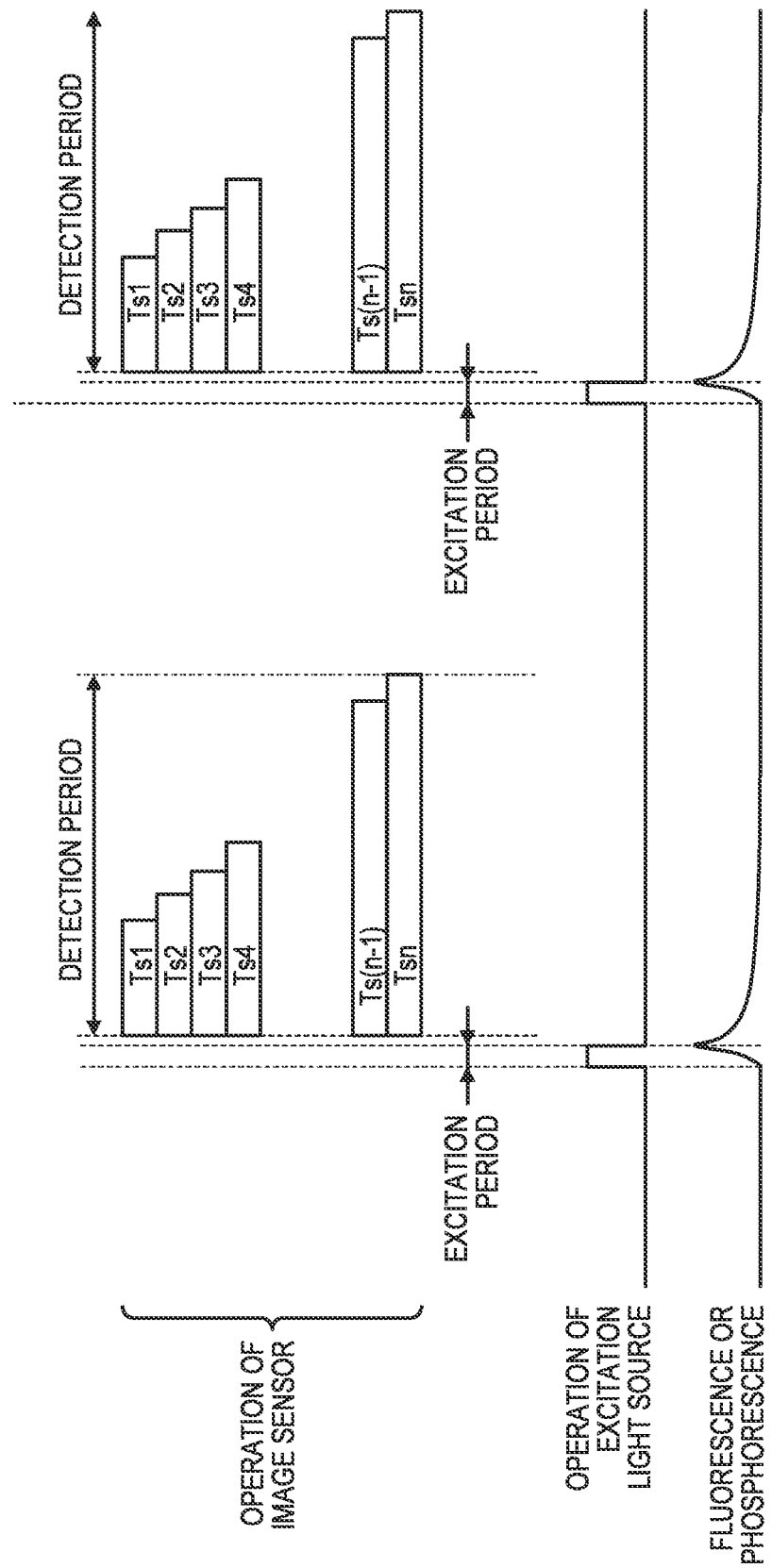
FIG. 9 is a chart showing the second operation example of the image sensing apparatus shown in FIG. 1.

The next will describe a case in which the image sensor IS is formed from a CMOS image sensor capable of collectively resetting all pixels, as a case in which the mechanical shutter 104 is not used for control in a detection period. The collective resetting of all the pixels is implemented by collectively applying the reset pulses φR shown in FIGS. 3 and 4 to all the pixels. FIG. 9 shows a case in which a detection period is controlled by collectively resetting all the pixels. The notational system in FIG. 9 complies with that in FIG. 8.

In the case shown in FIG. 9 as well, the control unit 101 controls an excitation period and a detection period so as to prevent them from overlapping. That is, the control unit 101 controls the excitation light source 120 and the image sensor IS so as to prevent an excitation period and a detection period from overlapping each other. More specifically, the control unit 101 turns on the excitation light source 120 and then turns it off while resetting all the pixels by setting the reset pulses φR to active level, and then cancels the reset states of all the pixels by inactivating the rese pulses φR. With this operation, detection periods collectively start in all the pixels (all the rows) of the image sensor IS. In the case shown in FIG. 9, while a plurality of rows are sequentially selected, the transfer transistors 75 transfer the charge in the photoelectric converters 73 to the charge voltage converters FD. The charge accumulation period in each pixel on each row is ended when the transfer transistor 75 of the corresponding pixel transfers the charge. Consequently, there are a plurality of rows in which accumulation periods differ from each other. In this case, it is assumed that the intensity of fluorescence or phosphorescence has sufficiently decreased at the end timing of an accumulation period Ts1 on the first row, and the difference in charge accumulation period between rows can be neglected.

Figure 10:
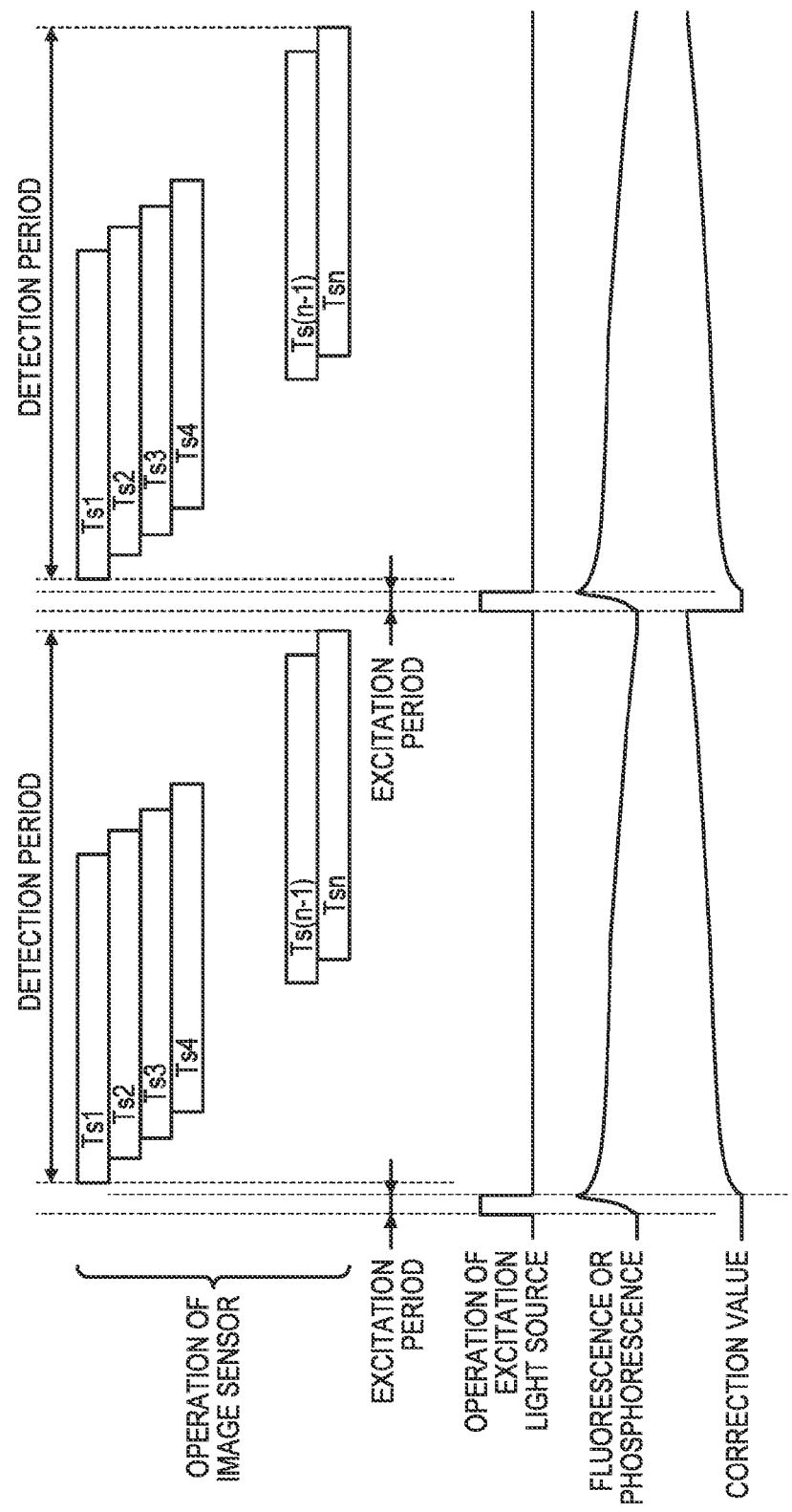
FIG. 10 is a chart showing the third operation example of the image sensing apparatus shown in FIG. 1.

Consider next the image sensor IS in which charge accumulation periods differ from each other on a plurality of rows, as exemplarily shown in FIG. 10, as another example of not using the mechanical shutter 104 for control on a detection period. The notational system in FIG. 10 complies with that in FIG. 8. The processing unit 103 corrects signals from (pixels on) a plurality of rows, which are output from the image sensor IS, so as to reduce the influence of a decrease in the intensity of fluorescence or phosphorescence in a detection period. As exemplarily shown as "correction value" in FIG. 10, the processing unit 103 corrects signals from (pixels on) a plurality of rows in accordance with the characteristic of a decrease in the intensity of fluorescence or phosphorescence in a detection period. More specifically, the processing unit 103 multiplies signals from the image sensor IS by correction values (gains) having smaller values as the distance to the first row selected early by the row selection unit 240 is shorter.

Figure 11:
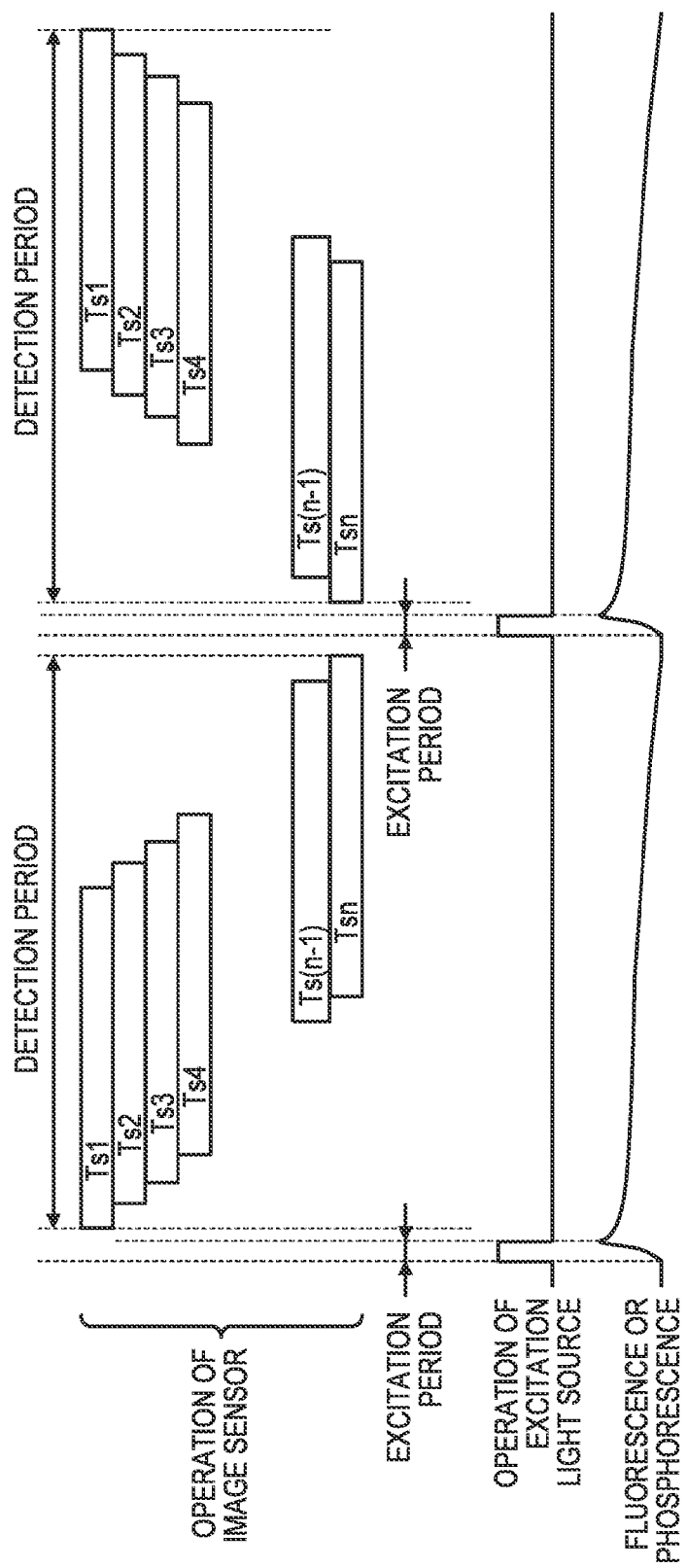
FIG. 11 is a chart showing the fourth operation example of the image sensing apparatus shown in FIG. 1.

FIG. 11 shows a case in which the image sensor IS performs control to reduce the influence of a decrease in the intensity of fluorescence or phosphorescence in a detection period. The image sensor IS includes a plurality of rows in which charge accumulation periods differ from each other. Image sensing by the image sensor IS includes the first image sensing performed while the row selection unit 240 scans a plurality of rows in a given direction and the second image sensing performed while the row selection unit 240 scans a plurality of rows in a direction opposite to the given direction. In this case, the row selection unit 240 is configured to switch a row selection direction. The processing unit 103 generates an output image based on the image obtained by the first image sensing and the image obtained by the second image sensing. For example, the processing unit 103 generates an output image by averaging or adding the image obtained by the first image sensing and the image obtained by the second image sensing.

Figure 12:
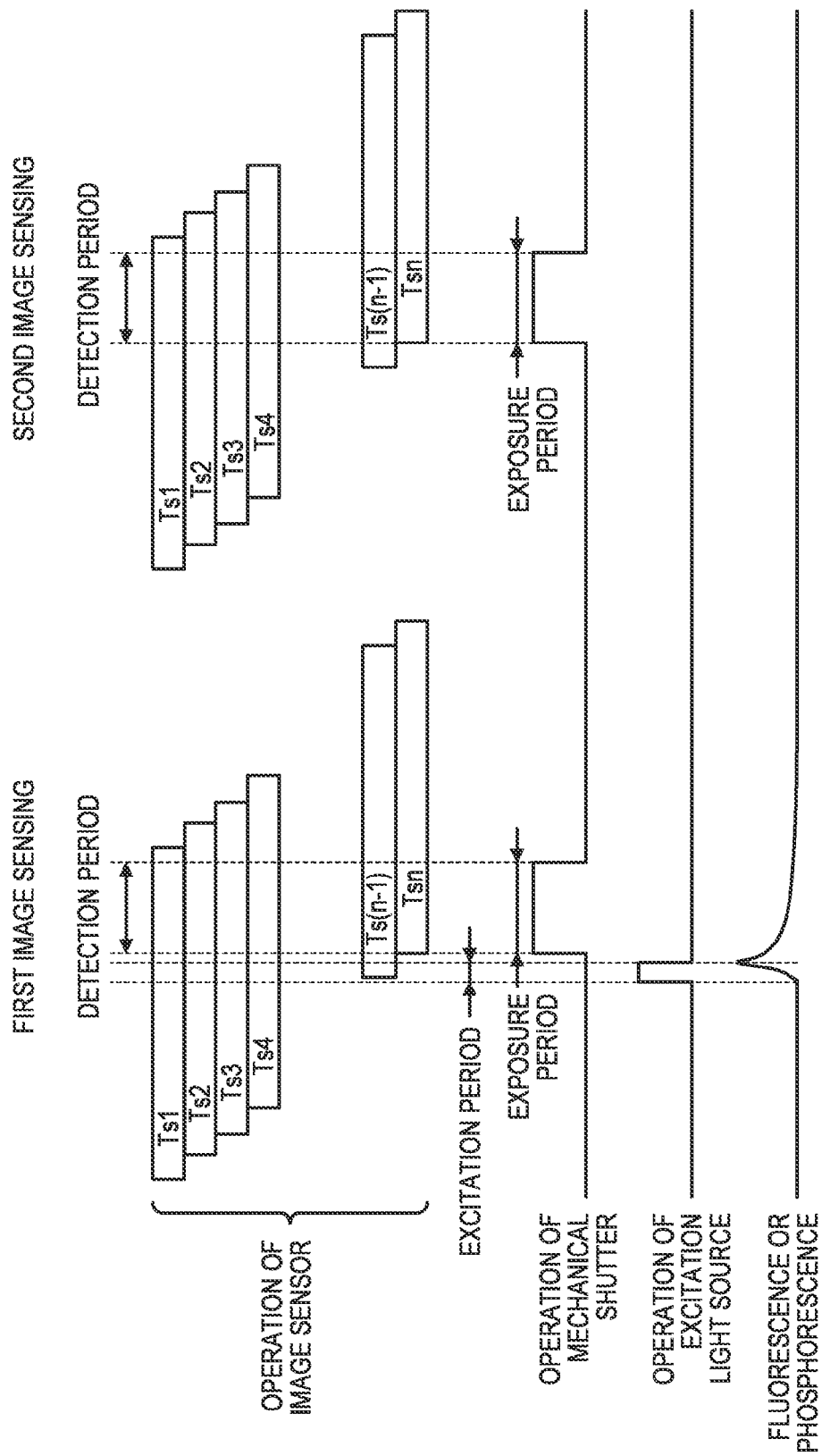
FIG. 12 is a chart showing the fifth operation example of the image sensing apparatus shown in FIG. 1.

FIG. 12 exemplarily shows another operation of the image sensing apparatus 100. The notational system in FIG. 12 complies with that in FIG. 8. In this case, image sensing by the image sensor IS which is performed under the control of control unit 101 includes the first image sensing performed in a detection period following an excitation period and the second image sensing performed after the first image sensing. In this case, the excitation light source 120 emits no excitation light between the first image sensing and the second image sensing, and the processing unit 103 generates an output image based on the image obtained by the first image sensing and the image obtained by the second image sensing. For example, the processing unit 103 generates an output image by computing the difference between the image obtained by the first image sensing and the image obtained by the second image sensing. With this processing, for example, an output image with reduced background noise can be obtained.

Figure 13:
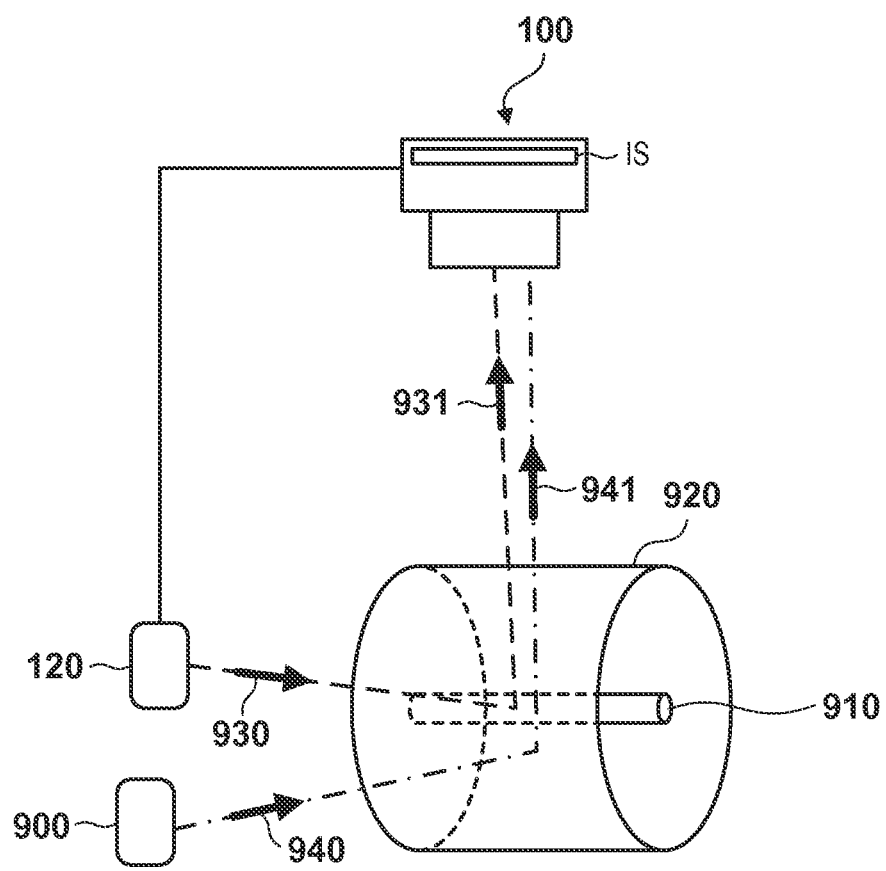
FIG. 13 is a view showing another example of applying the image sensing apparatus shown in FIG. 1 to a biopsy.

FIG. 13 shows another example of applying the image sensing apparatus 100 to a biopsy. FIG. 14 shows an example of the operation of the image sensing apparatus 100 shown in FIG. 13. In this example, the image sensor IS of the image sensing apparatus 100 includes pixels which detect fluorescence or phosphorescence and pixels which detect visible light. Alternatively, the image sensor IS may be formed by combining an image sensor which detects fluorescence or phosphorescence and an image sensor which detects visible light.

The object includes the scattering body 920 and the tissue 910 as an examination target arranged in the scattering body 920. The scattering body 920 is, for example, the arm or body of a subject. The tissue 910 is, for example, a blood vessel. In this case, a fluorescent material has been administered to the tissue 910. The excitation light source 120 irradiates the scattering body 920 with the excitation light 930. The tissue 910 irradiated with the excitation light 930 emits the fluorescence or phosphorescence 931 excited by the excitation light 930. The fluorescence or phosphorescence 931 is detected by pixels which detect fluorescence or phosphorescence. On the other hand, an illumination unit 900 which generates visible light 940 illuminates the scattering body 920 with the visible light 940. Visible light 941 scattered or reflected by the scattering body 920 illuminated with the visible light 940 is detected by pixels which detect visible light. For example, the illumination unit 900 emits the visible light 940 with constant intensity.

This specification has described the example of controlling an excitation period and a detection period so as to prevent them from overlapping. As another example, it is possible to control the image sensor so as to prevent a detection period from overlapping an excitation period repeating in a predetermined cycle, in order to prevent an excitation period and a detection period from overlapping each other. For example, the control unit 101 detects the cycle of the excitation light source 120 which repeatedly blinks in a predetermined cycle. The control unit 101 may then drive the image sensor, based on the detected cycle, so as to prevent a detection period and an excitation period from overlapping each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273168, filed Dec. 27, 2013, which is hereby incorporated by reference herein in its entirety.

What is claimed is:

1. An image sensing apparatus comprising:
an image sensor including a plurality of pixels which are arrayed to form a plurality of rows and a plurality of columns and perform photoelectric conversion for light, the image sensor being configured to sense, with a rolling shutter operation, an optical image formed from fluorescence or phosphorescence generated by excitation light from an excitation light source;
a mechanical shutter configured to control exposure on the image sensor; and
a controller configured to control the image sensor and the mechanical shutter so as to prevent overlapping between an excitation period and a detection period, the excitation period being a period during which the excitation light source emits excitation light, the detection period being a period during which the plurality of pixels are commonly set in a state of performing the photoelectric conversion for detecting fluorescence or phosphorescence and the mechanical shutter is open,
wherein the controller is configured to control the image sensor such that the excitation period starts in a state that pixels on at least a part of the plurality of rows are set and maintained in a charge accumulation state.

2. The apparatus according to claim 1, wherein the controller further controls an operation of the excitation light source so as to prevent the excitation period and the detection period from overlapping each other.

3. The apparatus according to claim 1, further comprising a processor configured to process an image sensed by the image sensor.

4. The apparatus according to claim 3, wherein the processor composites a plurality of images sensed by the image sensor.

5. The apparatus according to claim 1, wherein the controller controls repetition of a cycle including the excitation period and the detection period so as to make the image sensor sense a moving image.

6. The apparatus according to claim 1, wherein pixels on at least a first part of the plurality of rows of pixels are not set and maintained in the charge accumulation state before the start of the excitation period.

7. The apparatus according to claim 6, wherein pixels on a second part of the plurality of rows of pixels are set and maintained in the charge accumulation state after the start of the excitation period and before start of the detection period.

8. The apparatus according to claim 6, wherein pixels on at least one row of a second part of the plurality of rows of pixels are set and maintained in the charge accumulation state after an end of the excitation period and before start of the detection period.

9. An image sensing apparatus comprising:
an image sensor configured to sense an optical image formed from fluorescence or phosphorescence generated by excitation light from an excitation light source; and
a controller configured to control an operation of the image sensor so as to prevent overlapping between an excitation period during which the excitation light source emits excitation light and a detection period during which the image sensor detects fluorescence or phosphorescence, generated by the excitation light, by photoelectric conversion,
wherein the image sensor includes a plurality of rows of pixels on which charge accumulation periods on the plurality of rows of pixels differ from each other, and starts of the charge accumulation periods for the plurality of rows of pixels differing from each other, and
a processor configured to correct signals on the plurality of rows of pixels so as to reduce an influence of a decrease in intensity of fluorescence or phosphorescence in the detection period, wherein the processor multiplies the signals on the plurality of rows of pixels by correction values, each of which is assigned to a corresponding row of the plurality of rows of pixels, the correction values being determined such that a correction value for a row of pixels on which the charge accumulation period starts earlier has a smaller value than a correction value for a row of pixels on which the charge accumulation period starts later.

10. The apparatus according to claim 9, wherein the controller controls an operation of the image sensor so as to prevent the excitation period and the detection period from overlapping each other by controlling the image sensor so as to make the image sensor start accumulating charge after an end of the excitation period.

11. The apparatus according to claim 9, wherein the processor processes an image sensed by the image sensor.

12. The apparatus according to claim 11, wherein the processor composites a plurality of images sensed by the image sensor.

13. The apparatus according to claim 9, wherein the processor corrects signals on the plurality of rows of pixels in accordance with a characteristic of a decrease in intensity of fluorescence or phosphorescence in the detection period.

14. An image sensing apparatus comprising:
an image sensor configured to sense an optical image formed from fluorescence or phosphorescence generated by excitation light from an excitation light source;
a controller configured to control an operation of the image sensor so as to prevent overlapping between an excitation period during which the excitation light source emits excitation light and a detection period during which the image sensor detects fluorescence or phosphorescence, generated by the excitation light, by photoelectric conversion;
a processor configured to process an image sensed by the image sensor,
wherein the image sensor includes a plurality of rows of pixels on which charge accumulation periods on the plurality of rows of pixels differ from each other, and
the processor corrects signals on the plurality of rows of pixels so as to reduce an influence of a decrease in intensity of fluorescence or phosphorescence in the detection period,
wherein image sensing by the image sensor includes first image sensing performed in the detection period following the excitation period and second image sensing performed after the first image sensing, and the excitation light is not emitted from the excitation light source between the first image sensing and the second image sensing, and
wherein the processor generates an output image based on an image obtained by the first image sensing and an image obtained by the second image sensing.

15. The apparatus according to claim 14, wherein the controller controls repetition of a cycle including the excitation period and the detection period so as to make the image sensor sense a moving image.

16. An image sensing apparatus comprising:
an image sensor configured to sense an optical image formed from fluorescence or phosphorescence generated by excitation light from an excitation light source; and
a controller configured to control an operation of the image sensor so as to prevent overlapping between an excitation period during which the excitation light source emits excitation light and a detection period during which the image sensor detects fluorescence or phosphorescence, generated by the excitation light, by photoelectric conversion,
wherein the image sensor includes a plurality of rows of pixels which are collectively set in a charge accumulation state and individually set in a non-charge accumulation state so that charge accumulation periods on the plurality of rows of pixels differ from each other.

* * * * *